(12) United States Patent
Liu

(10) Patent No.: US 9,801,414 B2
(45) Date of Patent: Oct. 31, 2017

(54) ELECTRONIC CIGARETTE AND BATTERY ASSEMBLY THEREOF

(71) Applicant: Qiuming Liu, Shenzhen (CN)

(72) Inventor: Qiuming Liu, Shenzhen (CN)

(73) Assignee: HUIZHOU KIMREE TECHNOLOGY CO., LTD. SHENZHEN, Guangdong (CN)

( * ) Notice: Subject to any disclaimer, the term of this patent is extended or adjusted under 35 U.S.C. 154(b) by 80 days.

(21) Appl. No.: 14/119,029

(22) PCT Filed: Sep. 30, 2013

(86) PCT No.: PCT/CN2013/084703
§ 371 (c)(1),
(2) Date: Nov. 20, 2013

(87) PCT Pub. No.: WO2015/027548
PCT Pub. Date: Mar. 5, 2015

(65) Prior Publication Data
US 2016/0278432 A1 Sep. 29, 2016

(30) Foreign Application Priority Data

Aug. 30, 2013 (CN) .................... 2013 2 0539862 U

(51) Int. Cl.
*H02J 7/00* (2006.01)
*H02J 7/14* (2006.01)
(Continued)

(52) U.S. Cl.
CPC ......... *A24F 47/008* (2013.01); *H01M 2/1055* (2013.01); *H01M 2/204* (2013.01);
(Continued)

(58) Field of Classification Search
USPC ......... 320/107, 108, 114; 131/329, 273, 360
See application file for complete search history.

(56) References Cited

U.S. PATENT DOCUMENTS 5,631,538 A 5/1997 Komrska
2011/0304282 A1* 12/2011 Li .................... A24F 47/008
315/362

(Continued)

FOREIGN PATENT DOCUMENTS

CN 101390659 3/2009
CN 101390659 A 3/2009
(Continued)

OTHER PUBLICATIONS

European Search Report dated Apr. 20, 2017 for European application No. 13892730.6.
(Continued)

*Primary Examiner* — Alexis Pacheco
(74) *Attorney, Agent, or Firm* — Ohlandt, Greeley, Ruggiero & Perle, LLP

(57) ABSTRACT

The present application provides an electrical cigarette and a battery assembly thereof, wherein a first charging electrode assembly is arranged at a front end of the battery assembly, such that the battery assembly can be directly inserted into a charger to be charged without removing an atomizing assembly, therefore the operation is more convenient and disadvantages caused by frequent disassembling and assembling may be avoided. In addition, under the action of a charging management circuit, the electrode assembly at the front end can only be charged but cannot discharge, thereby avoiding an occurrence of a short circuit when the charging terminal discharges, extending the service life of the battery, and further avoiding a hidden danger of battery liquid leakage caused by the short circuit. In addition, since the front end of the electronic cigarette can not discharge, a situation that the electronic cigarette still has a low battery even been charged for a long time will not happen.

17 Claims, 6 Drawing Sheets

(51) Int. Cl.
  *A24F 47/00*   (2006.01)
  *H01M 2/10*   (2006.01)
  *H01M 2/20*   (2006.01)
  *H01M 2/34*   (2006.01)
  *H01M 10/05*  (2010.01)
  *H05B 3/06*   (2006.01)

(52) U.S. Cl.
  CPC ............. *H01M 2/34* (2013.01); *H01M 10/05* (2013.01); *H02J 7/0042* (2013.01); *H02J 7/0045* (2013.01); *H02J 7/0052* (2013.01); *H05B 3/06* (2013.01)

(56) References Cited

U.S. PATENT DOCUMENTS

| | | | |
|---|---|---|---|
| 2013/0042865 A1 | 2/2013 | Monsees et al. | |
| 2013/0298922 A1* | 11/2013 | Xiang | A24F 47/008 131/329 |
| 2014/0000638 A1* | 1/2014 | Sebastian | A24F 47/008 131/328 |
| 2014/0209110 A1* | 7/2014 | Hon | A24F 47/008 131/329 |
| 2015/0189915 A1* | 7/2015 | Liu | A24F 47/008 131/329 |
| 2016/0278433 A1 | 9/2016 | Xiang | |

FOREIGN PATENT DOCUMENTS

| | | |
|---|---|---|
| CN | 101860054 | 10/2010 |
| CN | 202872445 | 4/2013 |
| CN | 203087525 | 7/2013 |
| WO | 2013093695 A1 | 6/2013 |
| WO | 2015027547 A1 | 3/2015 |

OTHER PUBLICATIONS

European Search Report dated Jul. 26, 2017 for European application No. 13892730.6.

* cited by examiner

US 9,801,414 B2

ELECTRONIC CIGARETTE AND BATTERY ASSEMBLY THEREOF

This application claims is the national phase of International Application No. PCT/CN2013/084703, titled "ELECTRONIC CIGARETTE AND BATTERY ASSEMBLY THEREOF", filed on Sep. 30, 2013, which claims the benefit of priority to Chinese patent application No. 201320539862.2, titled "ELECTRONIC CIGARETTE AND BATTERY ASSEMBLY THEREOF", and filed with the Chinese State Intellectual Property Office on Aug. 30, 2013, the entire disclosure of which is incorporated herein by reference.

FIELD OF THE INVENTION

The present application relates to the technical field of electronic cigarettes, and particularly to an electronic cigarette and a battery assembly thereof.

BACKGROUND OF THE INVENTION

A conventional electronic cigarette mainly includes a battery assembly and an atomizing assembly, the structure of which is shown in FIG. 1. The battery assembly includes an end cap 11, a microphone controller 12, a microphone seat 13, a battery 14, a battery sleeve 15, a spring electrode 16, an electrode fixing seat 17, and a connecting seat 18. The atomizing assembly includes a connector 20, an upper electrode 21, an upper insulating ring 22, an atomizing seat 23, an electric heating wire 24, a PVC fiberglass sleeving 25, a tar storage cotton 26, an atomizing sleeve 27, a sealing ring 28 and a mouthpiece cover 29.

As shown in FIG. 1, working electrodes of the electronic cigarette are located at a portion where the battery assembly and the atomizing assembly are connected, and also serve as charging electrodes, i.e., a charging input terminal and a discharging output terminal of the electronic cigarette are the same port 19. Hence, when charging the battery assembly, the atomizing assembly needs to be disassembled firstly, and then a power supply can be input from an interface connecting the atomizing assembly to charge the battery, and a schematic circuit diagram is shown in FIG. 2.

It is easy to know that, the electronic cigarette having such structure in the prior art is inconvenient to operate, and is apt to cause wear and loose of the connecting portion over a long period of time, cause poor contact of the electrodes, and also may cause the loss of the atomizing assembly, thus may bring a bad using experience for a user.

Therefore, in view of the above situation, a technical problem to be solved presently by those skilled in the art is to provide an electronic cigarette having an improved structure, wherein the battery assembly may be charged without disassembling an atomizing assembly, thereby facilitating the operation.

SUMMARY

In view of this, the present application provides a battery assembly, which may be charged without disassembling an atomizing assembly, therefore the operation is more convenient, and disadvantages caused by frequently assembling and disassembling may be avoided.

The present application further provides an electronic cigarette having the battery assembly.

In order to achieve the above objects, the present application provides the following technical solutions.

A battery assembly, adapted to form an electronic cigarette in combination with an atomizing assembly, includes a battery and a first charging electrode assembly electrically connected to an electrode of the battery, wherein the first charging electrode assembly is arranged at one end of the battery assembly which is away from a connection between the battery assembly and the atomizing assembly, and a charging management circuit is arranged between the first charging electrode assembly and the battery to prevent the battery from discharging through the first charging electrode assembly.

Preferably, the first charging electrode assembly includes:
a small charging electrode arranged on an end surface of an end cap of the battery assembly, and the small charging electrode passes through the end surface of the end cap and is electrically connected to an electrode of the battery; and
an annular charging electrode arranged on a periphery surface of the battery assembly.

Preferably, the annular charging electrode is arranged between an outer side wall of the end cap and a battery sleeve of the battery assembly, and an exposed end surface of the annular charging electrode and the end surface of the end cap are on a same arc surface.

Preferably, the first charging electrode assembly includes two charging electrodes arranged on an end surface of an end cap of the battery assembly, and the two charging electrodes pass through the end surface of the end cap and are electrically connected to two electrodes of the battery respectively.

Preferably, the first charging electrode assembly includes:
a first charging electrode arranged on an end surface of an end cap of the battery assembly, and the first charging electrode passes through the end surface of the end cap and is electrically connected to one electrode of the battery; and
a battery sleeve of the battery assembly functioning as a second charging electrode, and the battery sleeve is electrically connected to the other electrode of the battery, and has a metallic outer surface, or is plated or coated with conductive material.

Preferably, the charging management circuit has an input terminal connected to a first terminal of the first charging electrode assembly, and an output terminal connected to one electrode of the battery, and a second terminal of the first charging electrode assembly is connected to the other electrode of the battery.

Preferably, the charging management circuit includes a charging integrated circuit, a first light emitting diode, a second light emitting diode, a capacitor, a first resistor, a second resistor, and a third resistor;
an anode of the first light emitting diode and an anode of the second light emitting diode are both connected to a VCC terminal of the charging integrated circuit, and the shared connecting terminal functions as the input terminal of the charging management circuit;
a cathode of the first light emitting diode is connected to a CHRG terminal of the charging integrated circuit via the first resistor, a cathode of the second light emitting diode is connected to an LED terminal of the charging integrated circuit via the second resistor, a PROG terminal of the charging integrated circuit is connected to a first terminal of the third resistor, and each of a second terminal of the third resistor, a GND terminal of the charging integrated circuit and a first terminal of the capacitor is grounded; and
the charging integrated circuit has a BAT terminal connected to a second terminal of the capacitor and functioning as the output terminal of the charging management circuit.

Preferably, the charging management circuit includes a diode, and the diode has an anode functioning as the input terminal of the charging management circuit and a cathode functioning as the output terminal of the charging management circuit.

Preferably, the charging management circuit and a microphone controller are integrated into a new integrated microphone control assembly.

Preferably, the charging management circuit includes a diode, and the diode has an anode connected to a negative electrode of the battery and a cathode connected to one charging electrode of the first charging electrode assembly.

An electronic cigarette includes a battery assembly and an atomizing assembly, wherein the battery assembly is the battery assembly described above.

Preferably, the battery assembly and the atomizing assembly share one outer sleeve.

Preferably, a metallic outer sleeve of the battery assembly is electrically connected to a metallic outer sleeve of the atomizing assembly.

As can be seen from the above technical solutions, in an electronic cigarette and a battery assembly thereof according to the present application, a first charging electrode assembly is arranged at a front end of the battery assembly, such that the battery assembly can be directly inserted into a charger to be charged without removing an atomizing assembly, therefore the operation is more convenient and disadvantages caused by frequent disassembling and assembling may be avoided. In addition, under the action of a charging management circuit, the electrode assembly at the front end can only be charged but cannot discharge, thereby avoiding an occurrence of a short circuit when the charging terminal discharges, and extending the service life of the battery.

BRIEF DESCRIPTION OF THE DRAWINGS

For more clearly illustrating embodiments of the present application or the technical solution in the prior art, drawings referred to describe the embodiments or the prior art will be briefly described hereinafter. Apparently, the drawings in the following description are only several embodiments of the present application, and for the person skilled in the art other drawings may be obtained based on these drawings without any creative efforts.

Figure 1:
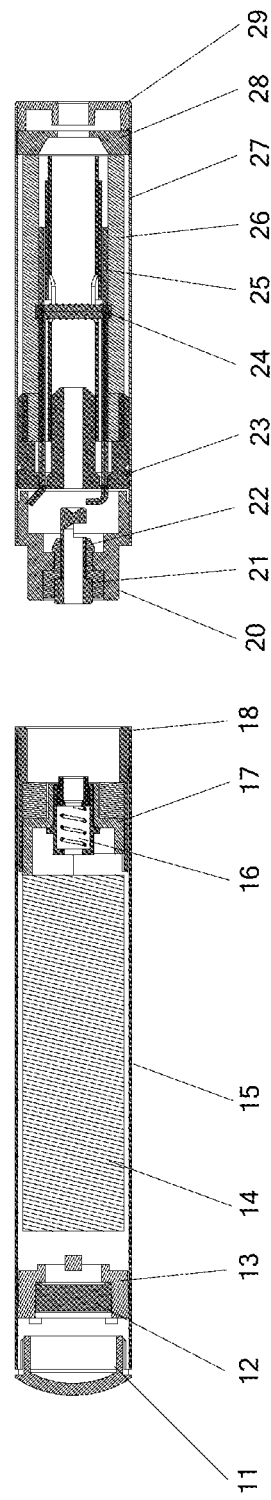
FIG. 1 is a schematic view showing the structure of an electronic cigarette in the prior art.
Figure 2:
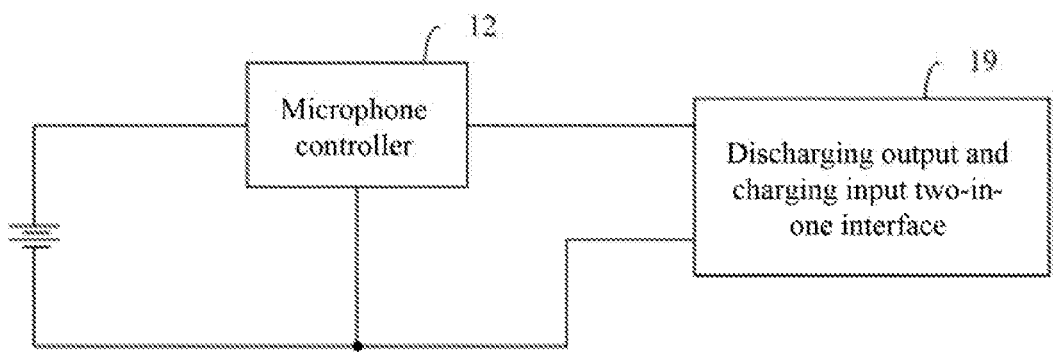
FIG. 2 is a schematic view showing the structure of a charging and discharging circuit of the electronic cigarette in the prior art.

Reference numerals in FIGS. 1 to 10:
11 end cap,
12 microphone controller,
13 microphone seat,
14 battery,
15 battery sleeve,
16 spring electrode,
17 electrode fixing seat,
18 connecting seat,
2 atomizing assembly,
19 discharging output and charging input two-in-one interface,
20 connector,
21 upper electrode,
22 upper insulating ring,
23 atomizing seat,
24 electric heating wire,
25 PVC fiberglass sleeving,
26 tar storage cotton,
27 atomizing sleeve,
28 sealing ring,
29 mouthpiece cover;
31 first charging electrode assembly,
32 charging and discharging two-in-one interface,
33 charging management circuit,
34 fixing seat,
35 small charging electrode,
36 annular charging electrode,
37 threaded outer electrode,
38 lower electrode,
39 insulating sleeve,
41 first charging electrode assembly,
42 discharging output port, and
43 new integrated microphone control assembly.

DETAILED DESCRIPTION OF THE PREFERRED EMBODIMENTS

The present application provides an electronic cigarette and a battery assembly thereof and a charging and discharging structure, and the battery assembly can be directly charged without removing an atomizing assembly, therefore the operation is more convenient and disadvantages caused by frequent disassembling and assembling are avoided.

The technical solutions in the embodiments of the present application will be described clearly and completely hereinafter in conjunction with the drawings in the embodiments of the present application. Apparently, the described embodiments are only a part of the embodiments of the present application, rather than all embodiments. Based on the embodiments in the present application, all of other embodiments, made by the person skilled in the art without any creative efforts, fall into the protection scope of the present application.

First Embodiment

The battery assembly according to an embodiment of the present application is adapted to form an electronic cigarette in combination with an atomizing assembly, and the battery assembly includes a battery and a first charging electrode assembly electrically connected to an electrode of the battery. A main improvement of the battery assembly lies in that, the first charging electrode assembly is arranged at one end of the battery assembly which is away from a connection between the battery assembly and the atomizing assembly, and a charging management circuit is arranged between the first charging electrode assembly and the battery to prevent the battery from discharging through the first discharging electrode assembly.

As can been seen from the above technical solution, in the battery assembly according to the embodiment of the present application, a first charging electrode assembly is arranged at a front end of the battery assembly and functions as a charging input interface, such that the battery assembly can be directly inserted into a charger to be charged without removing an atomizing assembly, therefore the operation is more convenient and disadvantages caused by frequent disassembling and assembling may be avoided. In addition, under the action of the charging management circuit, the electrode assembly at the front end can only be charged but cannot discharge, thereby avoiding an occurrence of a short circuit when the charging terminal discharges, extending the service life of the battery, and further avoiding a hidden danger of battery liquid leakage caused by the short circuit. In addition, since the front end of the electronic cigarette can not discharge, a situation that the electronic cigarette still has a low battery even been charged for a long time will not happen.

It should be noted that, the modified electronic cigarette according to this embodiment may also be charged in the charging method in the prior art, in addition to the above-mentioned charging method.

For further optimizing the above technical solution, the first charging electrode assembly may be arranged at an end cap of the battery assembly, i.e., away from an end of the battery assembly for connecting the atomizing assembly, and the working electrode is located at this end. Due to such structure, the electronic cigarette may be charged by inserting the end, having the end cap, of the electronic cigarette directly into the charger. It should be appreciated that, the end cap is referred to as a lamp cap when an LED light for simulating tobacco burning is arranged inside the end cap.

Three specific structures of the first charging electrode assembly are provided according to the present application and are described as follows.

The first charging electrode assembly includes:
a small charging electrode 35 arranged on an end surface of an end cap 11 of the battery assembly, and the small charging electrode 35 passes through the end surface of the end cap 11 and is electrically connected to one electrode of the battery 14; and
an annular charging electrode 36 arranged on a periphery surface of the battery assembly, which may be electrically connected to the other electrode of the battery 14 via a wire inside the battery assembly or a battery sleeve having a conductive structure.

Figure 3:
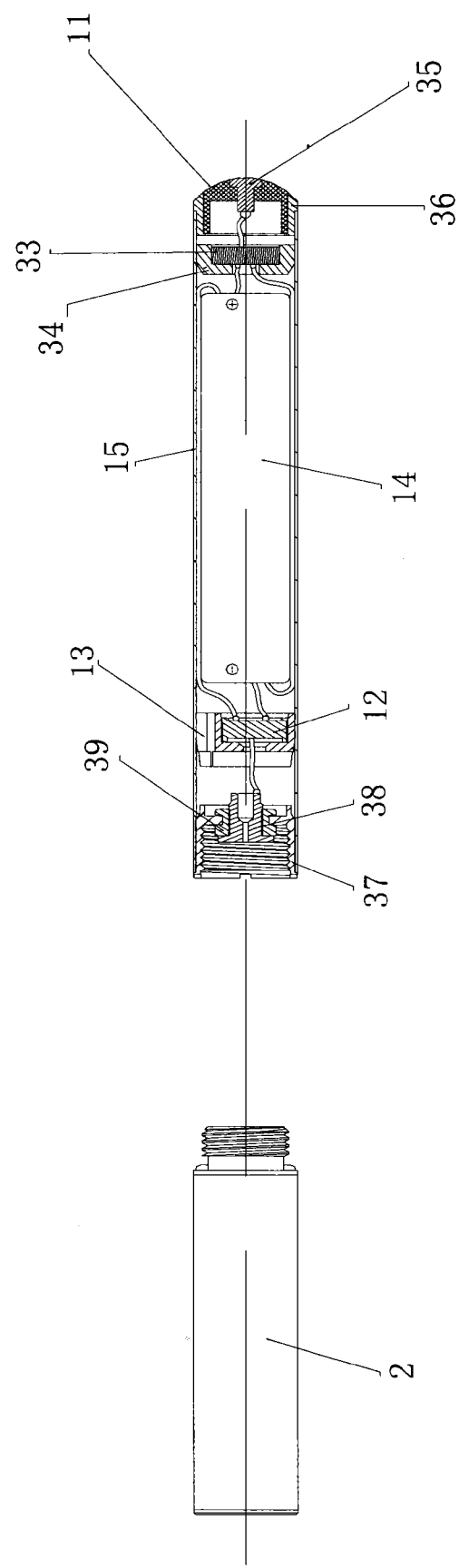
FIG. 3 is a schematic view showing the structure of an electronic cigarette according to an embodiment of the present application.
Figure 4:
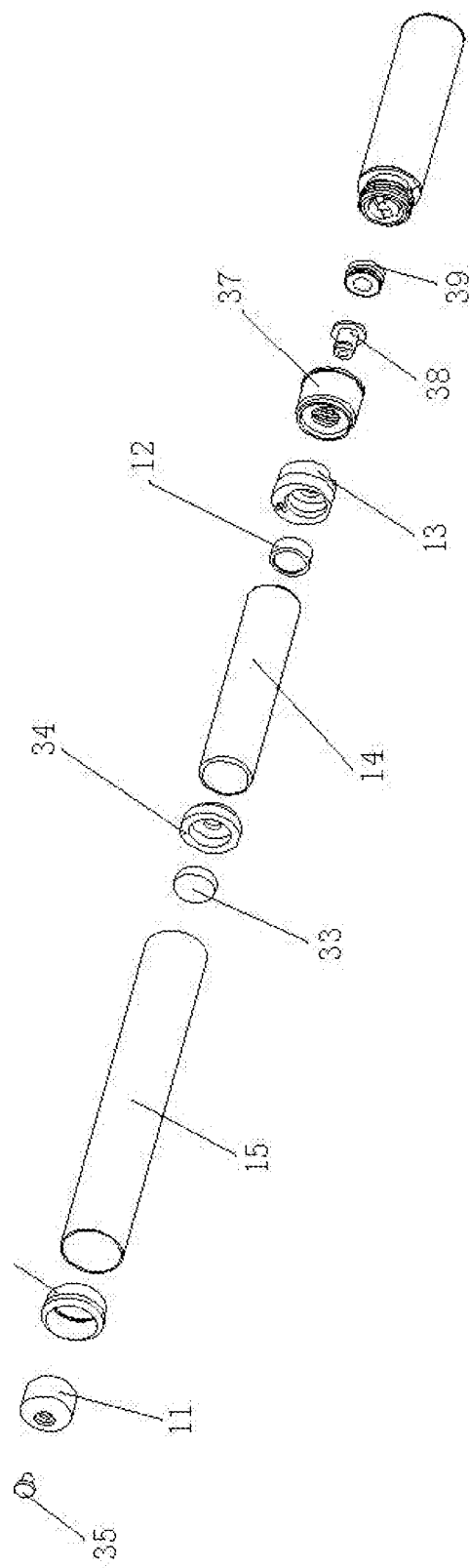
FIG. 4 is an exploded view of an electronic cigarette according to an embodiment of the present application.

Furthermore, the annular charging electrode 36 is arranged between an outer side wall of the end cap 11 and a battery sleeve 15 of the battery assembly. An exposed end surface of the annular charging electrode 36 and the end surface of the end cap 11 are on a same arc surface, the structure of which is shown in FIGS. 3 and 4. The exposed annular arc end surface of the annular charging electrode 36 may cooperate with a circular ring charging structure on the charger to achieve a reliable electrical connection.

Or, the first charging electrode assembly includes two charging electrodes arranged on an end surface of the end cap 11, and the two charging electrodes pass through the end surface of the end cap 11 and are electrically connected to two electrodes of the battery 14 respectively.

Or, a first charging electrode is arranged on an end surface of an end cap 11, passes through the end surface of the end cap 11 and is electrically connected to one electrode of the battery 14. A battery sleeve 15 of the battery assembly functioning as a second charging electrode is electrically connected to the other electrode of the battery 14 via a connecting seat 18 of the battery assembly, and the battery sleeve 15 has a metallic outer surface, or is plated or coated with conductive material. Since the battery sleeve 15 is directly utilized as an electrode, the whole electronic cigarette has a simple structure and is convenient to manufacture.

In a specific embodiment according to this solution, the charging management circuit 33 has an input terminal connected to a first terminal of the first charging electrode assembly 31, and an output terminal connected to one electrode of the battery 14, and a second terminal of the first charging electrode assembly 31 is connected to the other electrode of the battery 14.

Figure 5:
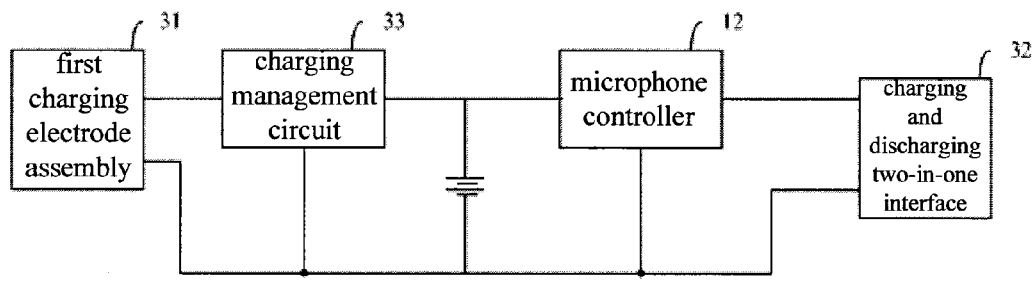
FIG. 5 is a schematic view showing the structure of a charging and discharging circuit of an electronic cigarette according to a first embodiment of the present application.

As shown in FIG. 5, a first terminal of the charging and discharging two-in-one interface 32 is connected to an output terminal of a microphone controller 12, and each of the second terminal of the first charging electrode assembly 31, a ground terminal of the microphone controller 12 and a second terminal of the charging and discharging two-in-one interface 32 is connected to a negative electrode of the battery.

An operation process of the charging and discharging circuit according to this embodiment is briefly described as follows in conjunction with the above connection relationship of the circuit. After being connected to an external power supply, the first charging electrode assembly charges the battery in the battery assembly through the charging management circuit. It should be noted that, the charging management circuit according to this embodiment has the same circuit structure and function as a charger of a common electronic device (such as a mobile phone or a tablet computer), which will not be described herein. Furthermore, due to the charging and discharging two-in-one interface 32, it may be convenient for a user to charge the battery through the charging and discharging two-in-one interface 32 with a charger in the prior art, in a case that there is no charger adapted with the first charging electrode assembly 31. Further, the battery may supply power to the atomizing assembly of the electronic cigarette through the charging and discharging two-in-one interface.

As can be seen from the above connection relationship of components of the battery assembly, the first embodiment is provided with an independent first charging electrode assembly, such that the battery assembly can be directly inserted into a charger to be charged without removing the atomizing assembly, therefore the operation is more convenient and disadvantages caused by frequent disassembling and assembling are avoided.

Figure 7:
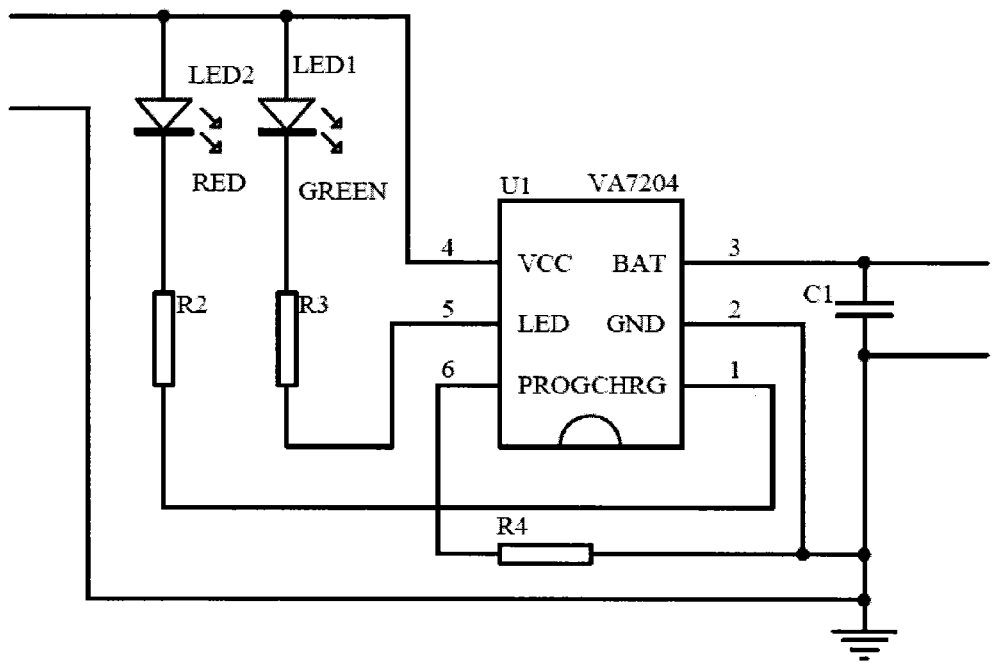
FIG. 7 is a specific circuit diagram of a charging management circuit according to the present application.

It should be noted that, the modified electronic cigarette according to this embodiment may also be charged in the charging method in the prior art, in addition to the above-mentioned charging method. Furthermore, the above microphone controller is a microphone controller in the prior art, which is not modified in this embodiment. The first embodiment further provides a specific implementation of the charging management circuit. As shown in FIG. 7, the charging management circuit includes a charging integrated circuit (abbreviated as IC), a first light emitting diode LED2, a second light emitting diode LED1, a capacitor C1, a first resistor R2, a second resistor R3, and a third resistor R4.

An anode of the first light emitting diode LED2 and an anode of the second light emitting diode LED1 are both connected to a VCC terminal of the charging IC, and the shared connecting terminal functions as an input terminal of the charging management circuit 33.

A cathode of the first light emitting diode LED2 is connected to a CHRG terminal of the charging IC via the first resistor R2, a cathode of the second light emitting diode LED1 is connected to an LED terminal of the charging IC via the second resistor R3, the charging IC has a PROG terminal connected to a first terminal of the third resistor R4, and each of a second terminal of the third resistor, a GND terminal of the charging IC and a first terminal of the capacitor C1 is grounded.

The charging IC has a BAT terminal connected to a second terminal of the capacitor C1 and functioning as an output terminal of the charging management circuit 33.

In conjunction with the specific circuit connection relationship, the operating principle of the charging management circuit is that the battery of the electronic cigarette is charged by the charging IC after a charging input interface is connected to an external power supply. Specifically, an electrical signal is input into the VCC terminal of the charging IC, and then the BAT terminal of the charging IC outputs the electrical signal to a positive electrode of the battery of the electronic cigarette. At this time, the light emitting diode LED2 is turned on, i.e., a red light is turned on, indicating that "the battery is being charged". When the charging IC detects that the battery is fully charged, the light emitting diode LED1 is turned on and the light emitting diode LED2 is turned off, i.e., when the battery is fully charged, a green light is turned on and the red light is turned off.

It should be noted that, the charging management circuit according to this embodiment is not limited to the specific circuit described above, and a circuit in a charging device of a common electronic device may also be used. Further, the color of the indicator lights are not limited herein, for example, the red light is turned on when the battery is being charged and is turned off when the battery is fully charged. There are many possible implementations of the charging circuits, which can not be described exhaustively in the present application, thus will not be described in detail herein.

Second Embodiment

Figure 6:
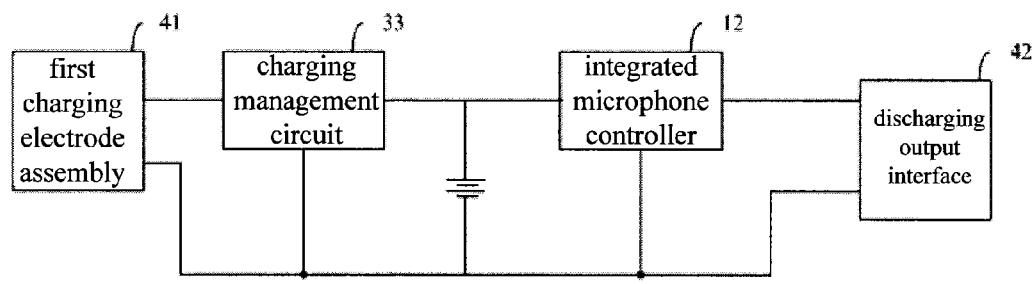
FIG. 6 is a schematic view showing the structure of a charging and discharging circuit of an electronic cigarette according to a second embodiment of the present application.

Referring to FIG. 6, another battery assembly according to the present application has a charging and discharging circuit including a microphone controller 12, which is a microphone controller in the prior art and is not modified in this embodiment. In addition, the charging and discharging circuit further includes a first charging electrode assembly 41, a discharging output interface 42 and a charging management circuit 33.

Unlike the first embodiment, this embodiment employs the discharging output interface to replace the charging and discharging two-in-one interface, so as to separate a charging interface from a discharging interface of the electronic cigarette. It should be noted that, the charging and discharging two-in-one interface and the discharging output interface not only refer to electrical elements at the interface portion, but also include corresponding interface circuits. In fact, when replacing the charging and discharging two-in-one interface with the discharging output interface, the change is mainly made to the internal interface circuit, and the structure of the electrical elements at the interface portion may remain unchanged. This embodiment has the same operating principle and circuit connection manner as the first embodiment, which will not be described in detail herein.

Third Embodiment

Figure 8:
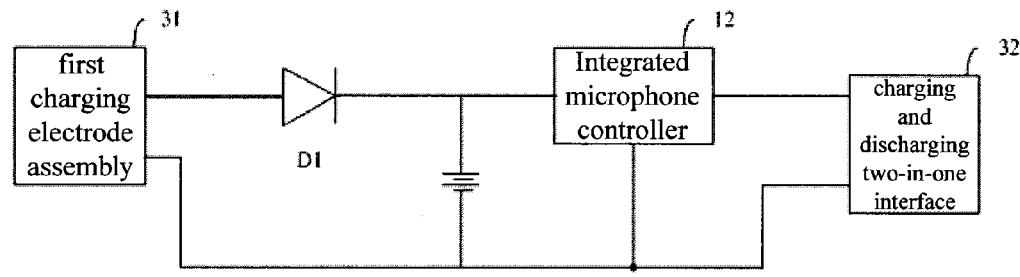
FIG. 8 is a schematic view showing the structure of a charging and discharging circuit of an electronic cigarette according to a third embodiment of the present application.

Reference is made to FIG. 8 which is a schematic view showing the structure of a charging and discharging circuit of a third battery assembly according to the present application. The charging and discharging circuit includes a microphone controller 12, a first charging electrode assembly 41, a charging and discharging two-in-one interface 34 (or a discharging output interface 42), and a charging management circuit 33. Unlike the above embodiments, in the third embodiment, the charging management circuit includes a diode D1. The diode has an anode functioning as an input terminal of the charging management circuit, and a cathode functioning as an output terminal of the charging management circuit.

Preferably, the diode may be a Schottky diode, a rectifier diode, or a switching diode, so as to realize a unidirectional control for charging input.

The structure of the charging management circuit according to this embodiment is obviously different from the structure of the specific circuits of the charging management circuits in the above embodiments, because in this embodiment, the charging management circuit in the above embodiments is arranged between the charging input port and an external power supply, i.e. the charging management circuit is used as an adapter for the external power supply, for example, a laptop needs to be connected to an external power supply (for example a socket) via a power supply adapter.

Similarly, a charging input interface and a discharging output interface (or a charging and discharging two-in-one interface) are separated from each other in the third embodiment, such that the battery assembly can be directly inserted into a charger to be charged without removing an atomizing assembly, therefore the operation is more convenient and disadvantages caused by frequent disassembling and assembling are avoided.

Fourth Embodiment

Figure 9:
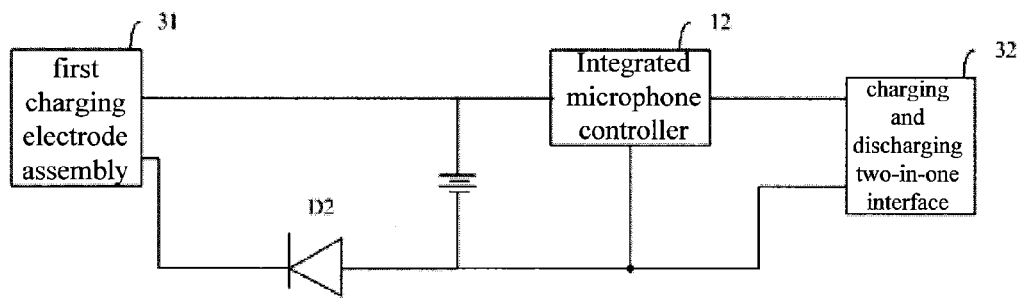
FIG. 9 is a schematic view showing the structure of a charging and discharging circuit of an electronic cigarette according to a fourth embodiment of the present application.

Similarly to the third embodiment, the fourth embodiment employs a diode as the charging management circuit, except that the specific position and arranging manner of the diode are slight different, i.e., the diode is connected to a negative electrode of the battery instead of being connected to the positive electrode of the battery. Referring to FIG. 9, an anode of the diode D2 is connected to the negative electrode of the battery, and a cathode of the diode D2 is connected to one charging electrode of the first charging electrode assembly, and other structures remain unchanged.

Fifth Embodiment

Figure 10:
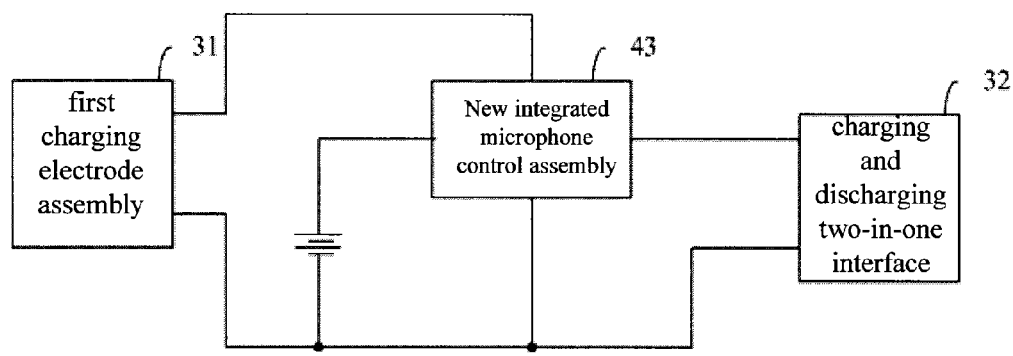
FIG. 10 is a schematic view showing the structure of a charging and discharging circuit of an electronic cigarette according to a fifth embodiment of the present application.

In a further embodiment as shown in FIG. 10, the entire structure is simplified by integrating the charging management circuit and the microphone controller as a new integrated microphone control assembly 43.

The battery assembly according to the embodiments of the present application may be applied not only in an electronic cigarette having a battery assembly and an atomizing assembly which are detachably assembled, but also in an electronic cigarette having a battery assembly and an atomizing assembly which are connected, for example the battery assembly and the atomizing assembly share one outer sleeve, or outer sleeves thereof are electrically connected.

In addition to the above embodiments, an embodiment of the present application further provides an electronic cigarette including a battery assembly and an atomizing assembly, wherein the battery assembly is the battery assembly according to any one of the above embodiments.

Furthermore, the battery assembly and the atomizing assembly share one outer sleeve, or a metallic outer sleeve of the battery assembly is electrically connected to a metallic outer sleeve of the atomizing assembly directly.

By electrically connecting the metallic outer sleeves of the battery assembly and the atomizing assembly directly, the metallic outer sleeve may function as a negative electrode. In this case, by inputting a positive electrode into the charging input interface at the lamp cap, the electronic cigarette may be charged through the lamp cap without disassembling the atomizing assembly, therefore the operation is convenient.

In conclusion, in the battery assembly and the electrical cigarette according to the embodiments of the present application, a first charging electrode assembly is arranged at a front end of the battery assembly, such that the battery assembly can be directly inserted into a charger to be charged without removing an atomizing assembly, therefore the operation is more convenient and disadvantages caused by frequent disassembling and assembling may be avoided. In addition, under the action of the charging management circuit, the electrode assembly at the front end can only be charged but cannot discharge, thereby avoiding an occurrence of a short circuit when the charging terminal discharges, extending the service life of the battery, and further avoiding a hidden danger of battery liquid leakage caused by the short circuit. In addition, since the front end of the electronic cigarette can not discharge, a situation that the electronic cigarette still has a low battery even been charged for a long time will not happen.

The above embodiments are described in a progressive manner. Each of the embodiments is mainly focused on describing its differences from other embodiments, and references may be made among these embodiments with respect to the same or similar portions among these embodiments.

Based on the above description of the disclosed embodiments, the person skilled in the art is capable of carrying out or using the present application. It is obvious for the person skilled in the art to make many modifications to these embodiments. The general principle defined herein may be applied to other embodiments without departing from the spirit or scope of the present application. Therefore, the present application is not limited to the embodiments illustrated herein, but should be defined by the broadest scope consistent with the principle and novel features disclosed herein.

The invention claimed is:

1. A battery assembly, adapted to form an electronic cigarette in combination with an atomizing assembly, comprising a battery and a first charging electrode assembly electrically connected to an electrode of the battery, wherein the first charging electrode assembly is arranged at one end of the battery assembly which is away from a connection between the battery assembly and the atomizing assembly, and a charging management circuit is arranged between the first charging electrode assembly and the battery to prevent the battery from discharging through the first charging electrode assembly; wherein the first charging electrode assembly comprises:
   a small charging electrode arranged on an end surface of an end cap of the battery assembly, and the small charging electrode passes through the end surface of the end cap and is electrically connected to an electrode of the battery; and
   an annular charging electrode arranged on a periphery surface of the battery assembly.

2. The battery assembly according to claim 1, wherein the annular charging electrode is arranged between an outer side wall of the end cap and a battery sleeve of the battery assembly, and an exposed end surface of the annular charging electrode and the end surface of the end cap are on a same arc surface.

3. The battery assembly according to claim 1, wherein the first charging electrode assembly comprises two charging electrodes arranged on an end surface of an end cap of the battery assembly, and the two charging electrodes pass through the end surface of the end cap and are electrically connected to two electrodes of the battery respectively.

4. The battery assembly according to claim 1, wherein the first charging electrode assembly comprises:
   a first charging electrode arranged on an end surface of an end cap of the battery assembly, and the first charging electrode passes through the end surface of the end cap and is electrically connected to one electrode of the battery; and
   a battery sleeve of the battery assembly functioning as a second charging electrode, and the battery sleeve is electrically connected to the other electrode of the battery, and has a metallic outer surface, or is plated or coated with conductive material.

5. The battery assembly according to claim 1, wherein the charging management circuit has an input terminal connected to a first terminal of the first charging electrode assembly, and an output terminal connected to one electrode of the battery, and a second terminal of the first charging electrode assembly is connected to the other electrode of the battery.

6. The battery assembly according to claim 5, wherein the charging management circuit comprises a charging integrated circuit, a first light emitting diode, a second light emitting diode, a capacitor, a first resistor, a second resistor, and a third resistor;
   an anode of the first light emitting diode and an anode of the second light emitting diode are both connected to a VCC terminal of the charging integrated circuit, and the shared connecting terminal functions as the input terminal of the charging management circuit;
   a cathode of the first light emitting diode is connected to a CHRG terminal of the charging integrated circuit via the first resistor, a cathode of the second light emitting diode is connected to an LED terminal of the charging integrated circuit via the second resistor, a PROG terminal of the charging integrated circuit is connected to a first terminal of the third resistor, and each of a second terminal of the third resistor, a GND terminal of the charging integrated circuit and a first terminal of the capacitor is grounded; and
   the charging integrated circuit has a BAT terminal connected to a second terminal of the capacitor and functioning as the output terminal of the charging management circuit.

7. The battery assembly according to claim 5, wherein the charging management circuit comprises a diode, and the diode has an anode functioning as the input terminal of the charging management circuit and a cathode functioning as the output terminal of the charging management circuit.

8. The battery assembly according to claim 5, wherein the charging management circuit and a microphone controller are integrated into a new integrated microphone control assembly.

9. The battery assembly according to claim 1, wherein the charging management circuit comprises a diode, and the diode has an anode connected to a negative electrode of the battery and a cathode connected to one charging electrode of the first charging electrode assembly.

10. An electronic cigarette, comprising a battery assembly and an atomizing assembly, wherein the battery assembly comprises a battery and a first charging electrode assembly electrically connected to an electrode of the battery, wherein the first charging electrode assembly is arranged at one end of the battery assembly which is away from a connection between the battery assembly and the atomizing assembly, and a charging management circuit is arranged between the first charging electrode assembly and the battery to prevent the battery from discharging through the first charging electrode assembly; wherein the first charging electrode assembly comprises:
  a small charging electrode arranged on an end surface of an end cap of the battery assembly, and the small charging electrode passes through the end surface of the end cap and is electrically connected to an electrode of the battery; and
  an annular charging electrode arranged on a periphery surface of the battery assembly.

11. The electronic cigarette according to claim 10, wherein the battery assembly and the atomizing assembly share one outer sleeve.

12. The electronic cigarette according to claim 10, wherein a metallic outer sleeve of the battery assembly is electrically connected to a metallic outer sleeve of the atomizing assembly.

13. The battery assembly according to claim 2, wherein the charging management circuit has an input terminal connected to a first terminal of the first charging electrode assembly, and an output terminal connected to one electrode of the battery, and a second terminal of the first charging electrode assembly is connected to the other electrode of the battery.

14. The battery assembly according to claim 3, wherein the charging management circuit has an input terminal connected to a first terminal of the first charging electrode assembly, and an output terminal connected to one electrode of the battery, and a second terminal of the first charging electrode assembly is connected to the other electrode of the battery.

15. The battery assembly according to claim 4, wherein the charging management circuit has an input terminal connected to a first terminal of the first charging electrode assembly, and an output terminal connected to one electrode of the battery, and a second terminal of the first charging electrode assembly is connected to the other electrode of the battery.

16. The electronic cigarette according to claim 10, wherein the first charging electrode assembly comprises two charging electrodes arranged on an end surface of an end cap of the battery assembly, and the two charging electrodes pass through the end surface of the end cap and are electrically connected to two electrodes of the battery respectively.

17. The electronic cigarette according to claim 10, wherein the first charging electrode assembly comprises:
  a first charging electrode arranged on an end surface of an end cap of the battery assembly, and the first charging electrode passes through the end surface of the end cap and is electrically connected to one electrode of the battery; and
  a battery sleeve of the battery assembly functioning as a second charging electrode, and the battery sleeve is electrically connected to the other electrode of the battery, and has a metallic outer surface, or is plated or coated with conductive material.

\* \* \* \* \*